US012699273B1

(12) United States Patent
von Schulmann et al.

(10) Patent No.: US 12,699,273 B1
(45) Date of Patent: Aug. 4, 2026

(54) RESETTABLE CLUTCH FOR IPD ADJUSTMENT

(71) Applicant: Apple Inc., Cupertino, CA (US)

(72) Inventors: Alexander B. von Schulmann, Sunnyvale, CA (US); Matin Seadat Beheshti, Sunnyvale, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 19/300,949

(22) Filed: Aug. 15, 2025

Related U.S. Application Data

(60) Provisional application No. 63/754,357, filed on Feb. 5, 2025.

(51) Int. Cl.
 G02B 27/01 (2006.01)
(52) U.S. Cl.
 CPC ..... G02B 27/0176 (2013.01); G02B 27/0172 (2013.01)
(58) Field of Classification Search
 CPC .................. G02B 27/0176; G02B 27/0172
 See application file for complete search history.

(56) References Cited

U.S. PATENT DOCUMENTS

| | | | | |
|---|---|---|---|---|
| 6,336,601 | B1 * | 1/2002 | Ueno | C22B 7/005 |
| | | | | 241/23 |
| 9,597,711 | B2 * | 3/2017 | Das | H05K 13/0486 |
| 11,136,191 | B1 * | 10/2021 | Rujanavech | B65G 1/137 |
| 2012/0306926 | A1 * | 12/2012 | Millet | G06T 3/4007 |
| | | | | 345/660 |
| 2012/0307141 | A1 * | 12/2012 | Millet | G06T 3/40 |
| | | | | 348/E7.003 |
| 2016/0150656 | A1 * | 5/2016 | Mäki | G06F 1/1637 |
| | | | | 361/679.01 |
| 2018/0338021 | A1 * | 11/2018 | Hebert | H04M 1/0277 |

* cited by examiner

*Primary Examiner* — Ricardo Osorio
(74) *Attorney, Agent, or Firm* — Dorsey & Whitney LLP

(57) ABSTRACT

A head mountable device includes a first display slidably coupled to a first guide, a second display slidably coupled to a second guide, and a synchronization system. The synchronization system can include a first synchronizer coupled to a second synchronizer, the first synchronizer can be configured to move in a first direction and the second synchronizer can be configured to move in a second direction opposite the first direction. The displays can be removably coupled to the respective synchronizers such that they disengage or decouple during a drop event. The synchronizers can also be configured to reengage the displays after disengagement.

19 Claims, 4 Drawing Sheets

RESETTABLE CLUTCH FOR IPD ADJUSTMENT

CROSS REFERENCE TO RELATED APPLICATIONS

This application claims the benefit of U.S. Provisional Application No. 63/754,357, filed 5 Feb. 2025, entitled "RESETTABLE CLUTCH FOR IPD ADJUSTMENT," the entire disclosure of which is hereby incorporated by reference.

FIELD

The examples of the present disclosure relate generally to electronic devices. More particularly, the examples of the present disclosure relate to head-mountable electronic devices.

BACKGROUND

Various components of head-mountable displays (HMD), such as optical modules, screens, viewing frames, securement arms, speakers, batteries, waveguides, and other components, operate together to provide an immersive and comfortable experience. Optical modules are generally disposed within the HMD to be positioned in front of a user's eyes. However, inter-pupillary distance (IPD), or the distance between a user's eyes, can vary from person to person. To adjust for differing IPD between users of HMDs, these devices can include display adjustment systems. These systems require precise movements and alignment between various displays and the user's eye positions. During use, unintended drop events, bumps, or other conditions can throw the IPD adjustment systems out of alignment, negatively effecting the precision and effectiveness of these systems and thus the user experience.

SUMMARY

Examples of the present disclosure include a head mountable device including a housing defining an internal volume, a first display slidably coupled to a first guide within the internal volume, a second display slidably coupled to a second guide within the internal volume, and a synchronization system. The synchronization system can include a first synchronizer coupled to a second synchronizer, the first synchronizer can be configured to move in a first direction and the second synchronizer can be configured to move in a second direction opposite the first direction. In such an example, the first display can be removably coupled to the first synchronizer and the second display can be removably coupled to the second synchronizer, the first display can be configured to disengage with the first synchronizer during a drop event, the second display can be configured to disengage with the second synchronizer during the drop event, and the first synchronizer can be configured to disengage from the second synchronizer during the drop event.

In one or more examples, the first display can disengage with the first synchronizer and the second display can disengage with the second synchronizer when the head mountable device experiences an input force of at least about 25 Newtons or more. In at least one example, the first synchronizer can disengage with the second synchronizer when the head mountable device experiences an input force of at least about 25 Newtons. In some examples, the synchronization system engages the first display and the second display independently and separately from the first guide and the second guide. In some examples, at least one of the first display or the first synchronizer includes a first detent, at least one of the second display or the second synchronizer includes a second detent, the first display is removably attached to the first synchronizer at the first detent, and the second display is removably attached to the second synchronizer at the second detent. In some examples, the first and second synchronizers are removably coupled via a friction clutch. In at least one example, the synchronization system includes an actuator configured to automatically move the first synchronizer and the second synchronizer.

In one or more examples, the first display can be recoupled with the first synchronizer by a user of the head mountable device after the first display has been decoupled from the first synchronizer. In some examples, the second display can be recoupled with the second synchronizer by the user of the head mountable device after the second display has been disengaged from the second synchronizer. In some examples, the friction clutch can include first and second segments coupled together, which can be recoupled by the user of the head mountable device after being decoupled during the drop event.

In various examples of the present disclosure, a wearable electronic device can include a housing defining an internal volume, an optical module, and an alignment track can be disposed within the internal volume. In some examples, the optical module can be slidably coupled to the alignment track. In one or more examples, an optical adjustment system separate from the alignment track can be disposed within the internal volume. In some examples, the optical module can be removably coupled to the optical adjustment system via a detent locking mechanism. In some examples, the detent locking mechanism can include a locking indent configured to receive a locking insert. In at least one example, a rotary mechanism can be configured to move the optical adjustment system.

In some examples, the optical module can be configured to decouple from the optical adjustment system during a drop event. In at least one example, the optical module can be configured to be recoupled to the optical adjustment system. In one or more examples, the locking insert can be defined by the optical module. In some examples, the locking insert can include at least one of a spring-loaded detent ball, a canted coil spring, a magnet, a leaf spring, or a break-away pin. In some examples, the locking indent is defined by a contact surface of the optical adjustment system. In at least one example, the contact surface can be configured to contact the optical module.

In some examples, the optical adjustment system can further include a securement pin and can define a pin aperture. In at least one example, the securement pin is configured to pass through the pin aperture. In at least one example, the securement pin can be attached to the housing. In at least one example, the optical adjustment system can be configured to move a length of the pin aperture before disengaging from the optical module.

In some examples, the locking insert and locking indent can be defined by either the optical module or on the optical adjustment system. In at least one example, one or more readjustment springs can be disposed between the optical module and the housing. In some examples, a first force configured to cause a coupling of the optical module to the optical adjustment system is less than a second force configured to cause a decoupling of the optical module from the optical adjustment system.

In various examples of the present disclosure, an electronic display assembly can include a housing. In some examples, the housing can define an inner volume. In some examples, a first display can be disposed within the inner volume. In some examples, a second display can be disposed within the inner volume. In at least one example, a synchronization system can also be disposed within the inner volume. In one or more examples, the synchronization system can further include a first synchronizer removably coupled to the first display and a second synchronizer removably coupled to the second display.

In some examples, the first synchronizer and the second synchronizer can be removably coupled via a friction clutch. In some examples, the first synchronizer and the second synchronizer can be configured to disengage with each other during a drop event. In some examples, the friction clutch can be at least one of a conical friction clutch or a plate friction clutch. In at least one example, the friction clutch can include ridges and grooves that can shear off during the drop event. In some examples, the friction clutch can include a ratchet lock.

BRIEF DESCRIPTION OF THE DRAWINGS

The disclosure will be readily understood by the following detailed description in conjunction with the accompanying drawings, wherein like reference numerals designate like structural elements, and in which.

DETAILED DESCRIPTION

Figure 1:
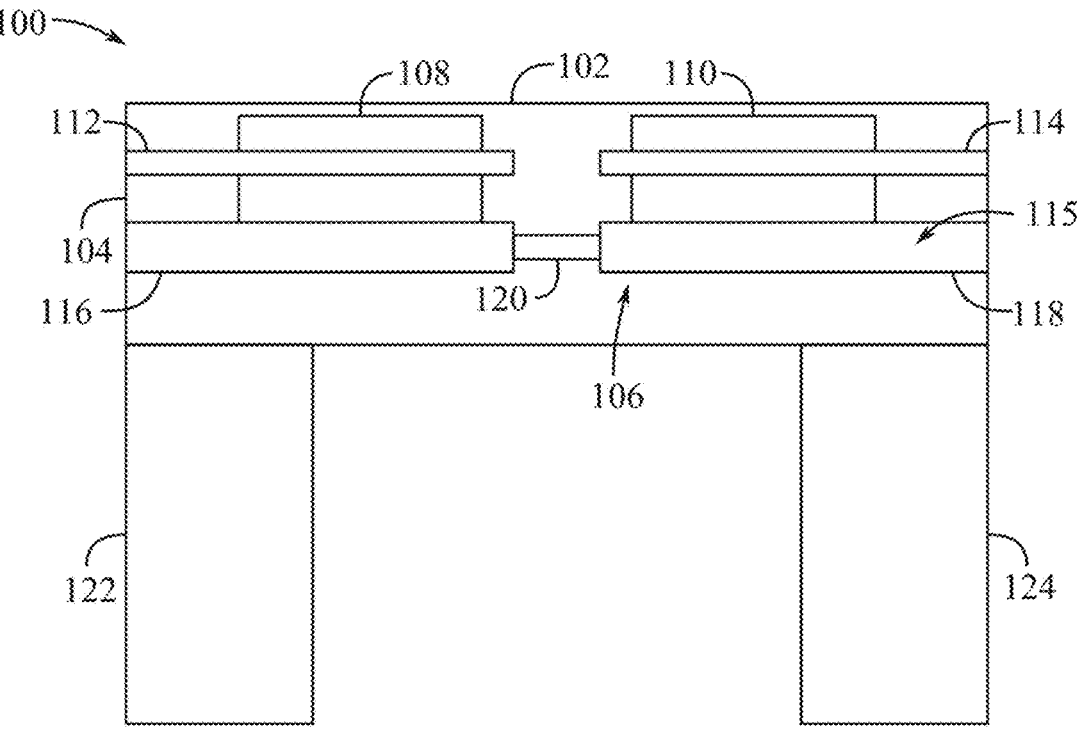
FIG. 1 illustrates a top-down view of an example of a head mountable device.

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

The present disclosure generally relates to electronic devices. More particularly, the present disclosure relates to head-mountable electronic devices. In at least one example, a head-mountable electronic device can include a housing. In some examples, a pair of securement arms can extend from the housing. The head-mountable devices can include optical devices (e.g., glasses, transparent windows, etc.) or virtual/augmented reality devices that can include an optical component. In these cases, the head-mountable device can be worn on the head of a user such that optical modules or displays can be positioned in front of a user's eyes.

Current head-mountable devices can include optical modules, screens, viewing frames, securement arms, speakers, batteries, waveguides, and other components, that work together to provide an immersive and comfortable experience to a user. Optical modules can be positioned in front of a user's eyes to project visual data. Current systems for adjusting IPD of displays in HMDs can be negatively affected by unintended drop events, extreme jostling, or other accidental events when the IPD adjustment systems are forced out of alignment or otherwise mispositioned. The present disclosure describes a head-mountable device that can synchronously adjust the position of optical modules based on a user's IPD and mitigate the stresses exerted by the optical modules on the adjustment system. The present disclosure describes a system in which the optical modules can disengage with the adjustment system when forces are applied to the head-mountable device and can later be reengaged with the adjustment system, thus preserving system precision, accuracy, and longevity during and after drop events.

As noted above, in a particular example, the head-mountable device can include an IPD adjustment system for adjusting displays, which can be or include a synchronization system that can be configured to adjust the position of the optical modules simultaneously and in opposite directions. For example, a synchronous IPD adjustment system can include an IPD adjustment system that moves the display in opposite directions toward each other and/or away from each other when matching the user's IPD. In some examples, the IPD synchronization and adjustment system can be configured to inversely adjust the optical modules to account for variation in IPD among users. In some examples, the synchronization system can be manually actuated or actuated by a motor. In at least one example, the optical modules can be removably coupled to the synchronization system. In some examples, the optical modules can be removably coupled to the synchronization system via a detent locking mechanism. In this way, during a drop event (e.g., if a user accidentally drops the HMD onto the floor), the IPD synchronization system can release the optical modules before damaging forces are transferred therebetween.

In at least some examples, the optical modules disposed within the head-mountable device can be configured to disengage with the synchronization system to prevent forces from transferring between optical modules and IPD adjustment systems. In some examples, the optical modules can be configured to disengage with the synchronization system when a certain threshold level of force is exceeded and exerted on the head-mountable device, such as during a drop event. This threshold force can be less than a damaging force. This can mitigate the stress exerted by the optical modules on the synchronization system, which can increase the lifespan of the head-mountable device and maintain sharp user visuals during operation.

In some examples, the optical modules can be slidably coupled to alignment tracks, where the alignment tracks are separate from the synchronization system. In some examples, when the optical modules have been disengaged from the synchronization system, the alignment tracks can limit the movement of the optical modules. In some examples, the alignment tracks can also align the optical modules for reengagement. In this way, the optical modules can disengage from the synchronization system without separating from the head-mountable device, therefore making reengagement of the optical modules easier.

In some examples, the optical modules can be reengaged with the IPD adjustment and synchronization system. In some examples, reengagement of the optical modules to the synchronization system can be done manually by the user, or automatically reengaged via a mechanical system or a motor. In some examples, the head-mountable device can include readjustment springs, which can move the optical module in place such that the detent locking mechanism can reengage the optical modules to the synchronization system. Additionally, the detent locking mechanisms can be configured such that reengagement of the optical modules to the synchronization system can be easier than disengagement. This can enhance the ease by which the head-mountable device is ready for operation after situations such as a drop event, therefore increasing effectiveness and efficiency of the head-mountable device.

In further examples of the present disclosure, the synchronization system can include a friction clutch. In some examples, rotation of the friction clutch in one direction can move the optical modules apart, and rotation of the friction clutch in the other direction can move the optical modules closer together. In some examples, the friction clutch can be configured to disengage with the synchronization system when forces are exerted on the head-mountable device, such as in a drop event. Additionally, the friction clutch can be configured to reengage with the synchronization system after disengagement. This can further mitigate the forces exerted on the synchronization system and increase the lifespan and efficiency of the head-mountable device.

These and other embodiments are discussed below with reference to FIGS. 1-5C. However, those skilled in the art will readily appreciate that the detailed description given herein with respect to these figures is for explanatory purposes only and should not be construed as limiting. Furthermore, as used herein, a system, a method, an article, a component, a feature, or a sub-feature including at least one of a first option, a second option, or a third option should be understood as referring to a system, a method, an article, a component, a feature, or a sub-feature that can include one of each listed option (e.g., only one of the first option, only one of the second option, or only one of the third option), multiple of a single listed option (e.g., two or more of the first option), two options simultaneously (e.g., one of the first option and one of the second option), or combination thereof (e.g., two of the first option and one of the second option).

FIG. 1 illustrates a top-down view of an example of a head-mountable device 100, in accordance with one or more examples of the present disclosure. In some examples, the head-mountable device 100 can be an electronic device configured to be donned by a user. In at least one example, the head-mountable device can be an electronic display assembly that can include a housing 102. In some examples, the housing 102 can be constructed out of a variety of materials. In at least one example, the housing 102 can be composed of a rigid structure and define an external surface 104. In some examples, the housing 102 can further define an internal volume 106. In some examples, the housing 102 can be coupled to a first securement arm 122 and a second securement arm 124. In at least one example, the first securement arm 122 and the second securement arm 124 can help secure the head-mountable device 100 to the head of a user when in use. In some examples, the device 100 can include a single securement band or a securement band formed of multiple parts configured to wrap around a user's head to secure the device 100 to the user.

In at least one example, the housing 102 can be configured to enclose a variety of components and modules within the internal volume 106. In some examples, a first display 108 can be disposed within the internal volume 106. In one or more examples, the first display 108 can be an optical module configured to display visual data to a user. In some examples, the first display 108 can include components such as circuits, projectors, fans, and other components used to display data to a user. In some examples, the first display 108 can be configured to display data such as videos, screens, or other visual material to a user's left eye.

Similarly, the head-mountable display device 100 can further include a second display 110 disposed within the internal volume 106. In at least one example the second display 110 can be an optical module configured to display data to a user. In some examples, the second display 110 can include components such as circuits, projectors, fans, and other components used to display data to a user. In some examples, the second display 110 can display videos, screens, or other visual material to a user's right eye. In some examples, the first display 108 can be electrically coupled with the second display 110, for example through controller, to display data to the user of the head-mountable device 100. For example, the first and second displays 108 and 110 can each display portions of an image, screen, or other visual data to the user through the user's left and right eyes, respectively. In some examples, this can enhance the immersion and comfort of the user when operating the head-mountable device 100.

In at least one example, the head-mountable device 100 can include a first guide 112 disposed within the internal volume 106. In some examples, the first guide 112 can be an alignment track slidably coupled with the first display 108 such that the first display 108 can move along the first guide 112. In some examples, the first guide 112 can extend at least partially through the internal volume 106. In at least one example, the first guide 112 can extend less than halfway across the internal volume 106. In other examples, the first guide 112 can extend halfway or more across the internal volume 106.

In at least one example, movement of the first display 108 can be defined by the first guide 112. For example, the first display 108 can slide along the first guide 112 in one direction within the internal volume 106. In some examples, the first display 108 can slide in an opposite direction along the first guide 112 within the internal volume 106. In some examples, the first display 108 can move through the internal volume 106 of the head-mountable device 100 along the first guide 112.

In one or more examples, the head-mountable device 100 can include a second guide 114 disposed within the internal volume 106. In some examples, the second guide 114 can be an alignment track slidably coupled with the second display 110 such that the second display 110 can move along the second guide 114. In some examples the second guide 114 can extend at least partially through the internal volume 106. In some examples, the second guide 114 can extend at least partially through the internal volume 106. In at least one example, the second guide 114 can extend less than halfway across the internal volume 106.

In some examples the second display 110 can move through the internal volume 106 of the head-mountable device 100 along the second guide 114. In some examples, the movement of the second display 110 can be defined by the second guide 114. For example, the second display 110 can slide along the second guide 114 in one direction within the internal volume 106. In at least one example, the second display can slide in a direction opposite the first direction along the second guide 114.

In some examples of the present disclosure, the head-mountable device 100 can include an IPD adjustment and synchronization system 115. In some examples, the synchronization system 115 can be a linear adjustment system that can adjust the position of the first and second displays 108 and 110. In some examples, the synchronization system 115 can be disposed within the internal volume 106 of the head-mountable device 100. In some examples, the synchronization system 115 can include a first synchronizer 116 and a second synchronizer 118. In at least one example, the first and second synchronizers 116, 118 can include mechanisms coupled to the respective displays 108, 110 and movable to adjust the displays 108, 110 along the guides 112, 114 as the mechanisms move. The synchronizer mechanisms can include gears, separate guides, actuators, and coupling mechanisms to couple, move, and adjust the displays 108, 110. In at least one example, the first synchronizer 116 can be configured to move in a first direction. In some examples, the second synchronizer 118 can be configured to move in a second direction opposite the first direction. In some examples, the first synchronizer 116 can be configured to move in a direction opposite the second synchronizer 118.

In some examples, the first synchronizer 116 can extend at least partially through the internal volume 106 of the head-mountable device 100. In one or more examples, the second synchronizer 118 can also extend at least partially through the internal volume 106. In some examples, the first synchronizer 116 can be removably coupled to the second synchronizer 118 via a friction clutch 120. In some examples, the friction clutch 120 can be a rotational adjustment system that can move the first synchronizer 116 and the second synchronizer 118. In some examples, the friction clutch 120 can be disposed between the first synchronizer 116 and the second synchronizer 118. In at least one example, the friction clutch 120 can enable synchronous movement of the first synchronizer 116 and the second synchronizer 118 in opposite directions. In some examples, rotation of the friction clutch 120 in one direction can move the first and second synchronizers 116 and 118 farther apart, where rotation of the friction clutch 120 in the other direction can move the first and second synchronizers 116 and 118 closer together. In additional examples, movement of the first synchronizer 116 can initiate rotation of the friction clutch 120, which can then move the second synchronizer 118 in the opposite direction and vice versa.

In some examples, the movement of the synchronization system 115 can be done manually by the user of the head-mountable device 100. In another example of the present disclosure, the movement of the synchronization system 115 can be done automatically via an actuator, for example a motor. In some examples the actuator can initiate the movement of the first synchronizer 116 and the second synchronizer 118 in opposite directions.

In at least one example, the friction clutch 120 can initiate the movement of the first synchronizer 116 and the second synchronizer 118. In some examples, the friction clutch 120 can be configured to rotate gears adjacent to the first synchronizer 116 and the second synchronizer 118. Additionally, and in some examples, the first synchronizer 116 and the second synchronizer 118 can include teeth configured to receive the gears rotated by the friction clutch 120. In some examples, the rotation of the gears can then move the first synchronizer 116 and the second synchronizer 118 in opposite directions. Such details and examples of different friction clutches, gears, teeth, and so forth, are given in other figures described below.

In some examples, the first synchronizer 116 can be removably coupled to the first display 108. Similarly, the second synchronizer 118 can be removably coupled to the second display 110. In some examples, the synchronization system 115 can sync the movement of the first display 108 with the movement of the second display 110. In some examples, the synchronization system 115 can be configured to move the position of the first and second displays 108 and 110. Furthermore, in some examples, the synchronization system 115 can be a linear adjustment system separate from the first guide 112 and the second guide 114.

For example, when the first synchronizer 116 moves in one direction, the first synchronizer 116 can move the first display 108 in the same direction. In some examples, when the first display 108 is moves in tandem with the first synchronizer 116, the first display 108 also moves along the first guide 112. Similarly, when the second synchronizer 118 moves in one direction it can move the second display 110 in the same direction along the second guide 114. In some examples, the synchronization system 115 can be used to position the first and second displays 108 and 110 in front of the left and right eyes of the user, respectively. In at least one example, this can enable the head-mountable device 100 to conform to the head shape and eye position of individual user's, therefore enhancing user comfort and accessibility to a wide variety of users. While the example shown in FIG. 1 illustrates guides 112, 114 being parallel and/or co-linear, other examples of devices 100 can include guides that are positioned at an angle relative to one another. Angled guides can define movements of the displays 108, 110 in a curved or angled fashion that correlate and accommodate the curvature of a user's face and relative eye positions.

In at least one example, the head-mountable device 100 can unintentionally be subject to external forces that put strain on various components, such as during a drop event. In some examples, a drop event can be an event that places forces on the head-mountable device 100 above a set threshold force above which potential damage to components can occur. In some examples, the threshold can be at least about 25 Newtons. Drop events can include unintended drops of the device 100, contacting the device against an unintended object such as a wall or object, and the like. During a drop event, or other event that exerts unintentional forces on the head-mountable device, the first display 108 can decouple from the first synchronizer 116. Similarly, the second display 110 can decouple from the second synchronizer 118 when forces are exerted on the head-mountable device 100. In one or more examples, the first synchronizer 116 can decouple from the second synchronizer 118 during a drop event. This can relieve the stress felt by various components during a drop event, which can increase the lifespan and functionality of the head-mountable device 100.

In some examples, the first display 108 can be recoupled with the first synchronizer 116 after decoupling. Likewise, the second display 110 can be recoupled with the second synchronizer 118 after decoupling. Additionally, the first synchronizer 116 can be recoupled with the second synchronizer 118 after decoupling. This can enhance the lifespan of components housed within the head-mountable device 100 in addition to furthering the overall modularity of the head-mountable device 100. Displays 108, 110 and respective synchronizers 116, 118 can be recoupled manually by moving the displays 108, 110 back into position such that the displays 108, 110 and respective synchronizers 116, 118 reengage using a removably coupling and recoupling mechanism. Examples of such coupling and decoupling mechanisms are described below with reference to at least FIGS. 3-5c. Some examples of these removable coupling mechanisms can include actuators, such as motors, configured to automatically move the displays 108, 110 and respective synchronizers 116, 118 back into position for recoupling without requiring manual adjustments from the user.

Examples of components that are removably coupled together, for example the displays and IPD adjustment and synchronization systems described herein, can include components that are intended to de-couple and recouple together intentionally without negatively affecting the functionality of those components. For example, the coupling between various displays and synchronizers described herein can include coupling mechanisms and coupling features designed to safely decouple without damaging the components. The term "removably coupled," including subsequent examples of "coupling," "engaging," "de-coupling," "disengaging," "re-coupling," and "reengaging," indicates a connection or engagement that can fix positions of relative components in place as well as intentionally terminate that connection while preserving the functionality and re-coupling ability of the "removably coupled" components. The coupling, de-coupling, and re-coupling of components described herein does not require repair or re-building of the de-coupled components. The de-coupling is intended by design.

Any of the features, components, and/or parts shown in FIG. 1 can be included, either alone or in any combination, in any of the other examples of devices, features, components, and parts shown in the other figures. Likewise, any of the features, components, and/or parts, including the arrangements and configurations thereof shown in the other figures can be included, either alone or in any combination, in the example of the devices, features, components, and parts shown in FIG. 1.

Figure 2A:
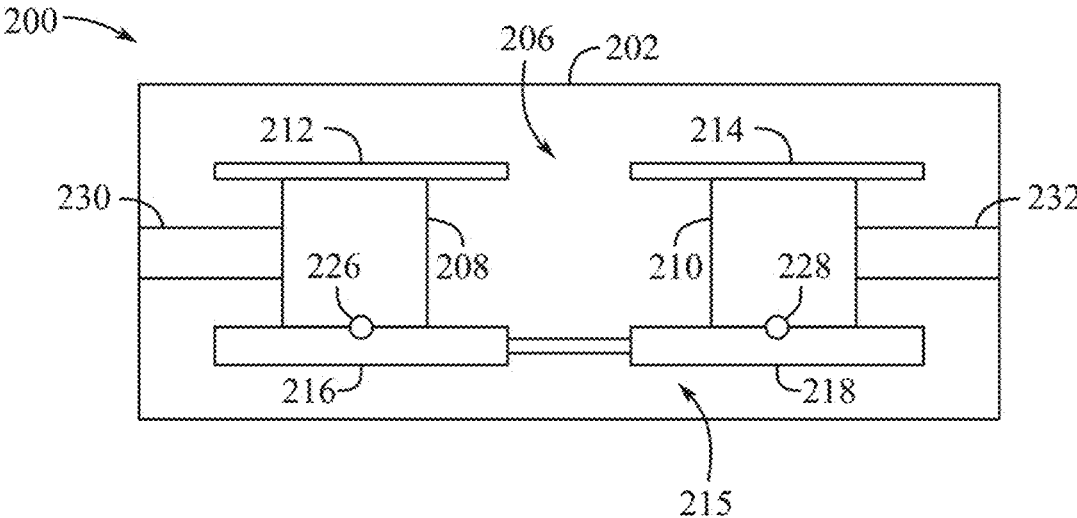
FIG. 2A illustrates a front-view of the head mountable device.

FIG. 2A illustrates a front-view of the head mountable device 200, in accordance with one or more examples of the present disclosure. In some examples, the synchronization system 215 is separate from the first guide 212 and the second guide 214. In some examples, the first and second guides 212 and 214 can be disposed within the internal volume 206 and configured to contact the first and second displays 208 and 210 in different areas than the first and second synchronizers 216 and 216.

As illustrated in FIG. 2A, the first and second guides 212 and 214 can be disposed between the first and second displays 208 and 210 and the external surface defined by the housing 202 of the head mountable device 200. In some examples, such as shown in FIG. 2A, the first and second synchronizers 216 and 218 can also be disposed between the external surface of the housing 202 and the first and second displays 208 and 210. In some examples the first display 208 can be disposed between the first guide 212 and the first synchronizer 216. Likewise, in some examples the second display 210 can be disposed between the second guide 214 and the second synchronizer 218. In other examples of the present disclosure, the synchronization system 215 and the first and second guides 212 and 214 can be disposed between the same side of the first and second displays 208 and 210 and the external surface of the housing 202 of the head-mountable device 200.

In at least one example, the size and/or mass of the first and second display 208 and 210 can be greater than other components disposed within the internal volume 206. When the head-mountable device 200 experiences sufficient external forces, such as in a drop event, the movement of the first and second displays 208 and 210 can put extra stress on the synchronization system 215. In some examples, the head-mountable device 200 can be dropped on its side, such that the first display 208 and the second display 210 are positioned above and below each other. In this example, because of the sideways orientation of the head-mountable device 200, the first and second displays 208 and 210 will tend to move in the same direction. This is contrary to the movement of the synchronization system 215, where the first synchronizer 216 and the second synchronizer 218 are configured to move the first and second displays 208 and 210 in opposite directions. This can put increased forces on the synchronization system 215. In some examples, the first display 208 can be removably attached to the first synchronizer 216 and the second display 210 can be removably attached to the second synchronizer 218 to mitigate the forces exerted on the synchronization system 215.

In some examples, the first display 208 can be removably attached to the first synchronizer 216 via a first detent locking mechanism 226. In some examples the second display 210 can be removably attached to the second synchronizer 218 via a second detent locking mechanism 228. In some examples, the first detent locking mechanism 226 can unlock and disengage the first display 208 from the first synchronizer 216 when the head-mountable device 200 experiences a sufficient input force, such as during a drop event. Similarly, the second detent locking mechanism 228 can unlock and disengage the second display 210 form the second synchronizer 218 when the head-mountable device 200 experiences a sufficient input force, such as a force above a safety threshold experienced during a drop event or other unintentionally high input force event.

In some examples, when the first detent locking mechanism 226 and the second detent locking mechanism 228 are unlocked, the first display 208 and the second display 210 will not move in tandem with the synchronization system 215 and will not be synced with each other. In some examples when the first and second detent locking mechanisms 226 and 228 are unlocked, the first display 208 can slide freely along the first guide 212 and the second display 210 can slide freely along the second guide 214. This can mitigate the forces exerted on the synchronization system 215 by the movement and/or inertia of the first and second displays 208 and 210, thus increasing the lifespan and durability of the head-mountable device 200.

In some examples, the first display 208 can be reengaged with the first synchronizer 216 after disengagement. Similarly, the second display 210 can be reengaged with the second synchronizer 218 after disengagement. In some examples, the user of the head-mountable device 200 can manually reengaged the first and second displays 208 and 210 with the first and second synchronizers 216 and 218, respectively. In other examples, the first and second displays can automatically be reengaged with the first and second synchronizers 216 and 218 via the use of a motor. In further examples of the present disclosure, one or more readjustment springs can be configured to reengage the first and second displays 208 and 210 with the first and second synchronizers 216 and 218.

As shown in FIG. 2A, a first readjustment spring 230 can be disposed within the internal volume 206 of the head-mountable device 200. In at least one example, the first readjustment spring 230 can be disposed between the first display 208 and the housing 202. In some examples, when the first display 208 is disengaged from the first synchronizer 216, the first readjustment spring 230 can push the first display 208 such that the first display 208 reengages with the first synchronizer 216. In this way, the first display 208 can automatically reengage with the first synchronizer 216 after being disengaged.

In another example, a second readjustment spring 232 can be disposed within the internal volume 206 of the head-mountable device 200. In at least one example, the second readjustment spring 232 can be disposed between the second display 210 and the housing 202. In some examples, when the second display 210 is disengaged with the second synchronizer 218, the second readjustment spring 232 can push the second display 210 to reengage with the second synchronizer 218. In this way, the second display 210 can automatically reengage with the second synchronizer 218 after being disengaged.

Figure 2B:
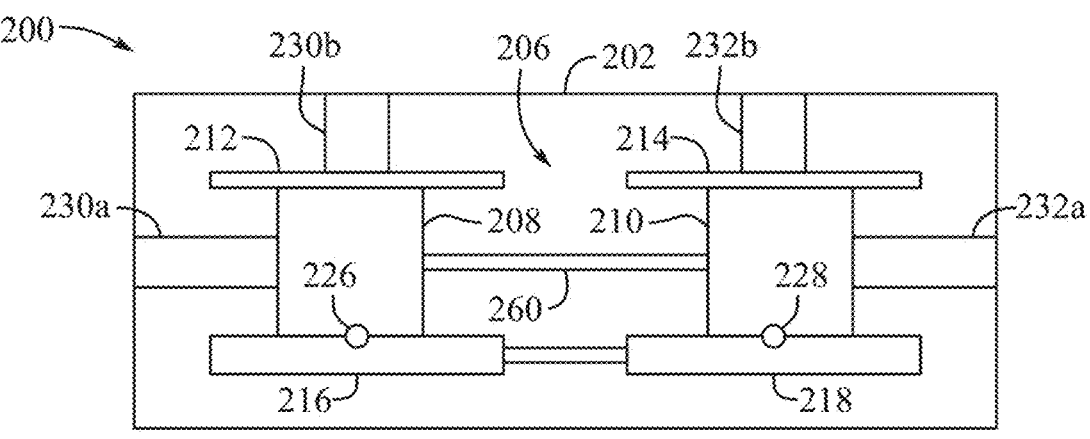
FIG. 2B illustrates another side-view of an example of the head mountable device with one or more readjustment springs.

FIG. 2B illustrates another front-view of the head mountable device 200, in accordance with one or more examples of the present disclosure. In the illustrated example, additional readjustment springs 230a and 230b can be disposed within the internal volume 206 of the head-mountable device 200. In at least one example, multiple readjustment springs 230a and 230b can be disposed within the internal volume 206. In some examples, the first readjustment springs 230a and 230b can further be disposed between the first display 208 and the housing 202. In at least one example, the first readjustment springs 230a and 230b can be disposed on different sides of the first display 208. In additional examples, there can be two or more readjustment springs configured to push against the first display 208.

In some examples, the first readjustment springs 230a and 230b can be configured to push against the first display 208 in multiple directions. In some examples, the first readjustment springs 230a and 230b can push the first display 208 across the first synchronizer 216 and can push the first display 208 toward the first synchronizer 216. In some examples, the first readjustment springs 230a and 230b can stabilize the first display 208 and bias the first display 208 to engage with the first synchronizer 216. In some examples, the multiple first readjustment springs 230a and 230b can reengage the first display 208 with the first synchronizer 216 after disengagement.

In some examples, multiple second readjustment springs 232a and 232b can be disposed within the internal volume 206. In some examples, the second readjustment springs 232a and 232b can be disposed between the second display 210 and the housing 202. In at least one example, the second readjustment springs 232a and 232b can be disposed on different sides of the second display 210. In other examples, two or more readjustment springs can be configured to push against the second display 210.

In some examples, the second readjustment springs 232a and 232b can be configured to push against the second display 210 in multiple directions. In some examples, the second readjustment springs 232a and 232b can push the second display 210 across the second synchronizer 218 and push the second display 210 toward the second synchronizer 218. In some examples, the second readjustment springs 232a and 232b can stabilize the second display 210 and cause the second display 210 to engage the second synchronizer 218. In some examples, the multiple second readjustment springs 232a and 232b can reengage the second display 210 with the second synchronizer 218 after disengagement.

In some examples, a flexible bridge 260 can be disposed between the first display 208 and the second display 210. In some examples, the flexible bridge 260 can be attached to the first display 208 and the second display 210. In at least one example, the flexible bridge 260 can be configured to push and/or pull either the first display 208 or the second display 210 relative to the other. In one or more examples of the present disclosure, the flexible bridge 260 can assist in aligning the first and second displays 208 and 210 with the eyes of the user.

In some examples, the flexible bridge 260 can compress when the first and second displays 208, 210 are close enough together and can stretch when they are far enough apart. This compression and stretching can push/pull the first and second displays 208, 210 such that the displays 208, 210 align with the eyers of the user of the head-mountable device 200. In some examples, the flexible bridge 260 can also be configured to help reengage the first display 208 with the first synchronizer 216 and the second display 210 with the second synchronizer 218. For example, the flexible bridge 260 can move the first display 208 such that the first detent locking mechanism 226 locks the first display 208 to the first synchronizer 216. Likewise, the flexible bridge 260 can move the second display 210 such that the second detent locking mechanism 228 engages and locks the second display 210 to the second synchronizer 218.

Any of the features, components, and/or parts shown in FIGS. 2A and 2B can be included, either alone or in any combination, in any of the other examples of devices, features, components, and parts shown in the other figures. Likewise, any of the features, components, and/or parts, including the arrangements and configurations thereof shown in the other figures can be included, either alone or in any combination, in the example of the devices, features, components, and parts shown in FIGS. 2A and 2B.

Figure 3:
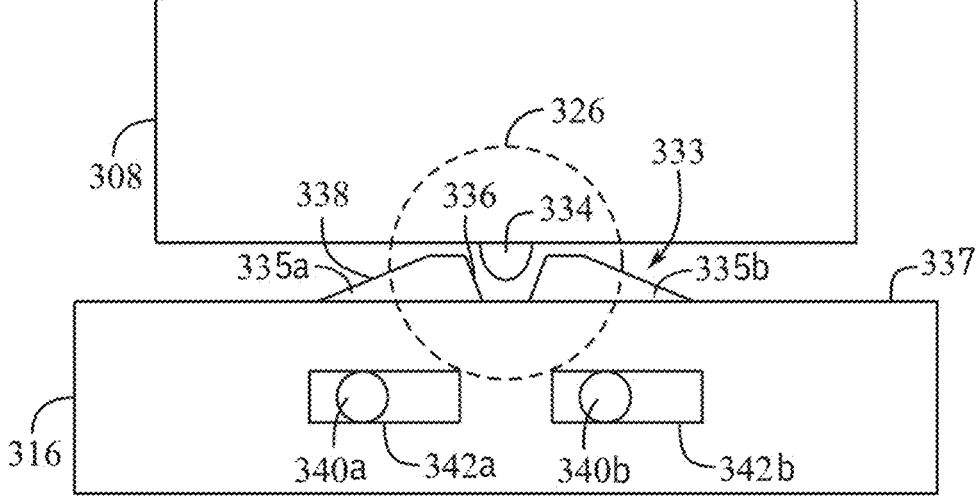
FIG. 3 illustrates an example of a detent locking mechanism.

FIG. 3 shows a side view of the first detent locking mechanism 326, in accordance with one or more examples of the present disclosure. In some examples, the details herein describing the first detent locking mechanism 326 can be applied to the second detent locking mechanism 228, second display 210, and the second synchronizer 218 shown above in FIG. 2B. In some examples, the detent locking mechanism 326 can include components disposed on the first display 308 and the first synchronizer 316. In some examples, the detent locking mechanism 326 can include a locking indent 333. In some examples, the locking indent 333 can be configured to receive a locking insert 334. In at least one example, the locking indent 333 can be disposed on the first synchronizer 316, and the locking insert 334 can be disposed on the first display 308. In other examples, the locking indent 333 can be disposed on the first display 308, and the locking insert 334 can be disposed on the first synchronizer 316. In at least one example, the locking indent 333 can receive the locking insert 334 and couple the first display 308 to the first synchronizer 316.

As shown in FIG. 3, the locking insert 334 can be a spring-loaded detent ball that can extend into the locking indent 333 to couple the first display 308 to the first synchronizer 316. In some examples, the locking insert 334 can be a different component that can couple the first display 308 to the first synchronizer 316. In some examples, the locking insert 334 can be a coil spring or a canted coil spring. In this example, the coil spring or canted coil spring can wrap around the circumference of the first display 308 and can extend into the locking indent 333 similar to the locking insert 334 shown in FIG. 3. In some examples of the present disclosure, the locking insert 334 can be other components that can couple to the locking indent 333 such as a protrusion of a leaf spring, break-away pins, or magnets.

In some examples, the locking indent 333 can protrude from a contact surface 337 of the first synchronizer 316. In some examples, the contact surface 337 can be configured to contact the first display 308. In some examples, the contact surface 337 can be smooth except for the locking indent 333.

This can enable the first display 308 and the locking insert 334 to slide easily along the contact surface 337 until the locking insert 334 interacts with the locking indent 333. This can decrease the force exerted on the first synchronizer 316 when the first display 308 disengages and engages with the first synchronizer 316, thus enhancing the lifespan and durability of the head-mountable device 100.

In some examples, the locking indent 333 can include a first stop 335a and a second stop 335b. In some examples the first and second stops 335a and 335b can protrude from the contact surface 337. In some examples, when the first display 308 is coupled to the first synchronizer 316, the locking insert 334 can be disposed between the first stop 335a and the second stop 335b. In some examples, the first stop 335a and the second stop 335b can limit the locking insert 334 from moving, thus coupling the first display 308 to the first synchronizer 316.

In some examples, the first stop 335a and the second stop 335b can each include an inner wall 336 and an outer wall 338. In some examples, the inner walls 336 of the first and second stops 335a and 335b can be configured to retain the locking insert 334. In one or more examples, the inner walls 336 of the first and second stops 335a and 335b can include a steeper incline than the outer walls 338 relative to the contact surface 337. In some examples, the steeper incline of the inner walls 336 can increase the force required for the locking insert 334 to move outside of the locking indent 333. In at least one example the steep incline of the inner walls 336 can increase the force needed to disengage the first display 308 with the first synchronizer 316.

In one or more examples of the present disclosure, the locking insert 334 can be configured to pass the inner walls 336 of the first and second stops 335a and 335b when the head-mountable device 100 experiences different levels of external forces, such as a set threshold force during a drop event. In some examples, the locking indent 333 can retain the locking insert 334 during normal operation of the head-mountable device 100. In at least one example, the first display 308 can be configured to decouple from the first synchronizer 316 when the head-mountable device 100 experiences an input force of about 25 Newtons or more.

In at least one example, the outer walls 338 of the first and second stops 335a, 335b can be configured to assist in reengagement of the first display 308 to the first synchronizer 316. In some examples, the incline of the outer walls 338 is not as steep as the inner walls 336 of the first and second stops 335a, 335b. In some examples, the lesser incline of the outer walls 338 reduces the amount of force needed to reengage the first display 308 to the first synchronizer 316. In some examples, the reengagement of the first display 308 to the first synchronizer 316 can be easier than disengagement.

In some examples, when reengaging the first display 308 to the first synchronizer 316, the locking insert 334 can gradually compress against the outer wall 338 of either the first stop 335a or the second stop 335b until extending between the first and second stops 335a and 335b. In some examples of disengaging the first display 308 from the first synchronizer 316, the locking insert 334 can abruptly compress against the inner wall 336 of either the first stop 335a or the second stop 335b until extending outside of the locking indent 333. In some examples, the gradual compression of the locking insert 334 during reengagement can use less force than disengagement of the first display 308 from the first synchronizer 316. This can enhance the ease of using the head-mountable device 100 by after the first display 308 has been disengaged from the first synchronizer 316.

In one or more examples of the present disclosure, the first synchronizer 316 can also include one or more securement pins and one or more pin apertures. As shown in FIG. 3, the first synchronizer 316 can include a first securement pin 340a and a second securement pin 340b. In some examples, the first securement pin 340a can be disposed within a first pin aperture 342a. Similarly, the second securement pin 340b can be disposed within a second pin aperture 342b. In some examples, the first and second securement pins 34a and 340b can extend through their respective pin apertures 342a and 342b. In some examples the first and second securement pins 340a and 340b can attach to the housing 102 of the head-mountable device 100 shown in FIG. 1.

In some examples, the pin apertures 342a and 342b can be slightly wider than the diameter of the securement pins 340a and 340b. In some examples, the first synchronizer 316 can move the length of the pin apertures 342a and 342b, such that the securement pins 340a and 340b travel the length of the pin apertures 342a and 342b. In some examples, the first synchronizer 316 can move the length of the one or more pin apertures 342a and 342b before disengaging from the first display 308. In at least one example, when an external force is exerted on the head-mountable device 100, the securement pins 340a and 340b can travel the length of the pin apertures 342a and 342b before the locking insert 334 begins to compress on either the first stop 335a or the second stop 335b. In some examples, the one or more securement pins 340a and 340b moving through the one or more pin apertures 342a and 342b can be act as a buffer for small forces. In at least one example, this can enable the head-mountable device 100 to experience smaller jolts and drops resulting in forces exerted under the set force threshold without the first display 308 disengaging from the first synchronizer 316.

Any of the features, components, and/or parts shown in FIG. 3 can be included, either alone or in any combination, in any of the other examples of devices, features, components, and parts shown in the other figures. Likewise, any of the features, components, and/or parts, including the arrangements and configurations thereof shown in the other figures can be included, either alone or in any combination, in the example of the devices, features, components, and parts shown in FIG. 3.

Figure 4:
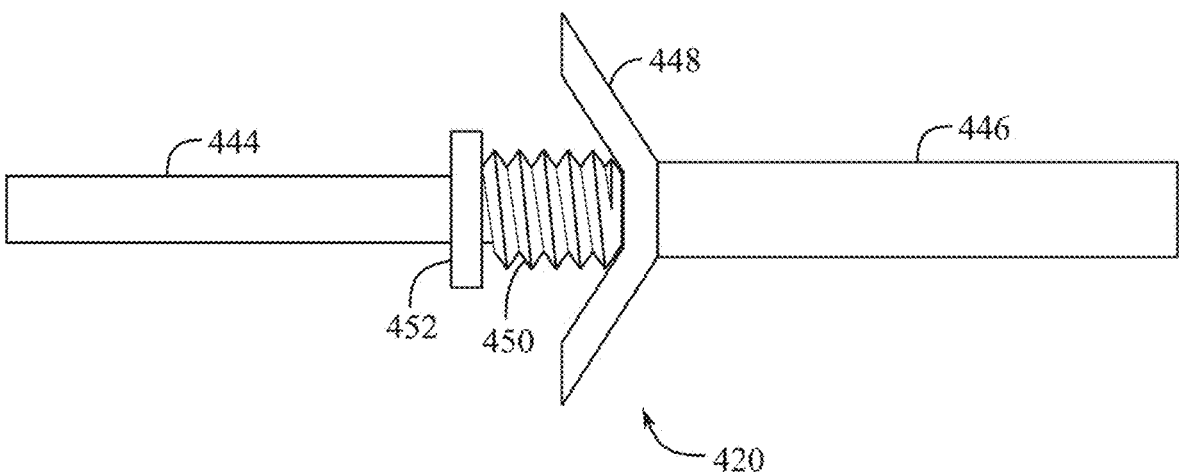
FIG. 4 illustrates an example of a conical friction clutch.

FIG. 4 illustrates a side-view of the friction clutch 420, in accordance with one or more examples of the present disclosure. In some examples, the friction clutch 420 can be a conical friction clutch. In other examples of the present disclosure, the friction clutch 420 can be a plate friction clutch. In at least one example, the friction clutch 420 can include a first segment 444 and a second segment 446. In some examples, the first segment 444 can be coupled to the first synchronizer 216 shown in FIG. 2 and the second segment 446 can be coupled to the second synchronizer 218. In some examples, the first and second segments 444, 446 of the friction clutch 420 can be configured to rotate. In at least one example, the rotation of the first segment 444 can move the first synchronizer 216 in a linear fashion and the rotation of the second segment 446 can move the second synchronizer 218 in a linear fashion.

In some examples, the diameter of the first segment 444 can be smaller than the diameter of the second segment 446. In some examples, the first segment 444 can fit inside the second segment 446. Furthermore, in at least one example, the friction clutch 420 can include a friction cone 448. In some examples, the friction clutch 420 can include a clutch spring 450 and a spring stop 452. In some examples, the spring stop 452 can be a raised portion of the first segment 444. In at least one example, the clutch spring 450 can be disposed between the friction cone 448 and the spring stop 452. In some examples, the spring stop 452 can retain the clutch spring 450 as the clutch spring 450 presses the friction cone 448 against the second segment 446. In some examples, the friction cone 448 can frictionally couple the first segment 444 to the second segment 446. For example, when the first segment 444 rotates, the friction cone 448 can exert a rotational friction force on the second segment 446. This friction force exerted by the friction cone 448 on the second segment 446 can enable the second segment 446 to rotate with the first segment 444.

In some examples, the first segment 444 and the second segment 446 can disengage with each other when the head-mountable device 100 experiences external forces above the threshold, such as in a drop event. In some examples, such as during a drop event, the first segment 444 and the second segment 446 can tend to rotate in opposite directions. In some examples, the friction cone 448 can be configured to exert a friction force so the first segment 444 and the second segment 446 can rotate in opposite directions when external forces are applied to the head-mountable device 100. In some examples, the clutch spring 450 can push the friction cone 448 into the second segment 446 to reengage the first segment 444 to the second segment 446. In at least one example, the friction clutch 420 can be automatically reengaged after being disengaged. For example, the first and second segments 444, 446 are configured to de-couple during a drop event and be recoupled together automatically or by the user after the drop event so the synchronizers can adjust the IPD of the displays. In some examples, the user of the head-mountable device 100 can reengage the first segment 444 to the second segment 446.

Any of the features, components, and/or parts shown in FIG. 4 can be included, either alone or in any combination, in any of the other examples of devices, features, components, and parts shown in the other figures. Likewise, any of the features, components, and/or parts, including the arrangements and configurations thereof shown in the other figures can be included, either alone or in any combination, in the example of the devices, features, components, and parts shown in FIG. 4.

Figure 5A:
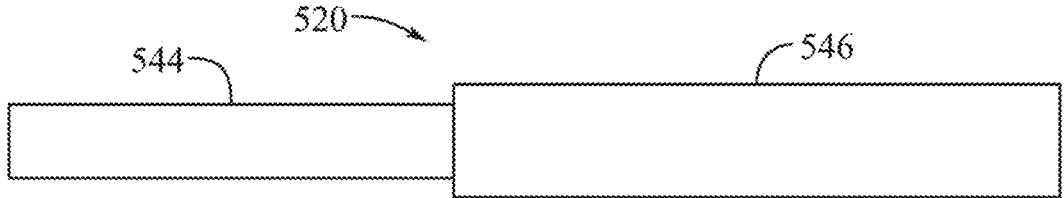
FIG. 5A illustrates another example of a friction clutch.

FIG. 5A illustrates another side-view of the friction clutch 520, in accordance with one or more examples of the present disclosure. In some examples, the first segment 544 can be rotationally coupled to the second segment 546 without the use of the friction clutch 420 or similar component, shown above in FIG. 4. In at least one example, the first segment 544 of the friction clutch 520 can have a smaller diameter than the second segment 546. In some examples the first segment 544 can extend at least partially into the second segment 546. In at least one example, the rotation of the first segment 544 can induce the rotation of the second segment 546 and vice versa.

Any of the features, components, and/or parts shown in FIG. 5A can be included, either alone or in any combination, in any of the other examples of devices, features, components, and parts shown in the other figures. Likewise, any of the features, components, and/or parts, including the arrangements and configurations thereof shown in the other figures can be included, either alone or in any combination, in the example of the devices, features, components, and parts shown in FIG. 5A.

Figure 5B:
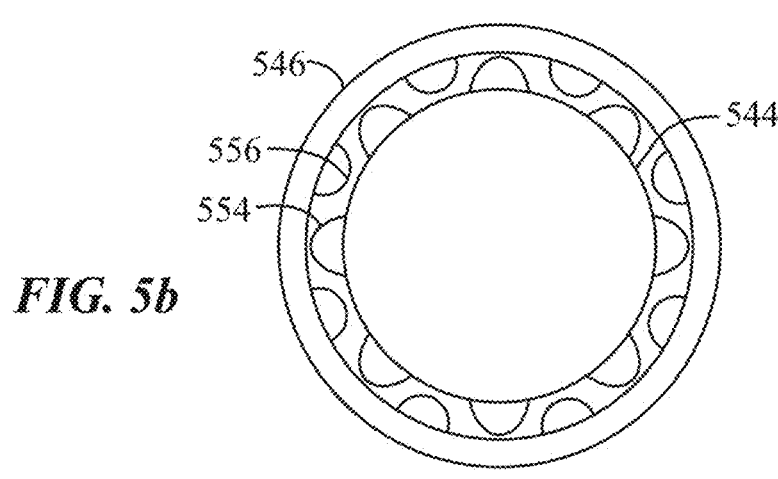
FIG. 5B illustrates a cross-sectional side-view of an example of the friction clutch.

FIG. 5B illustrates a cross-sectional view of the friction clutch 520, in accordance with one or more examples of the present disclosure. In some examples, the first segment 544 can include inner ridges 554. In at least one example, the inner ridges 554 can run along the length of the first segment 544. In some examples, the inner ridges 554 can further extend into the second segment 546. In some examples, the second segment 546 can be configured to receive the first segment 544 and the inner ridges 554. In at least one example, the second segment 546 can include outer ridges 556. In some examples, the outer ridges 556 can extend along the inside of the second segment 546 where the second segment 546 is configured to receive the first segment 544.

In some examples, the inner ridges 554 and the outer ridges 556 can interlock, as illustrated in FIG. 5B. In at least one example, the interlocking of the outer ridges 556 and the inner ridges 554 can rotationally couple the first segment 544 to the second segment 546. For example, the rotation of either the first segment 544 or the second segment 546 can induce rotation of the other through the interlocking of the inner ridges 554 and the outer ridges 556. In some examples, the inner ridges 554, the outer ridges 556, or both the inner ridges 554 and the outer ridges 556, can shear off when the head-mountable device 100 experiences a sufficient input force, such as during a drop event. This can enable the first segment 544 and the second segment 546 to rotate in different directions to account for the first display 108 and the second display 110 moving or disengaging with the first and second synchronizers 116 and 118.

Any of the features, components, and/or parts shown in FIG. 5B can be included, either alone or in any combination, in any of the other examples of devices, features, components, and parts shown in the other figures. Likewise, any of the features, components, and/or parts, including the arrangements and configurations thereof shown in the other figures can be included, either alone or in any combination, in the example of the devices, features, components, and parts shown in FIG. 5B.

Figure 5C:
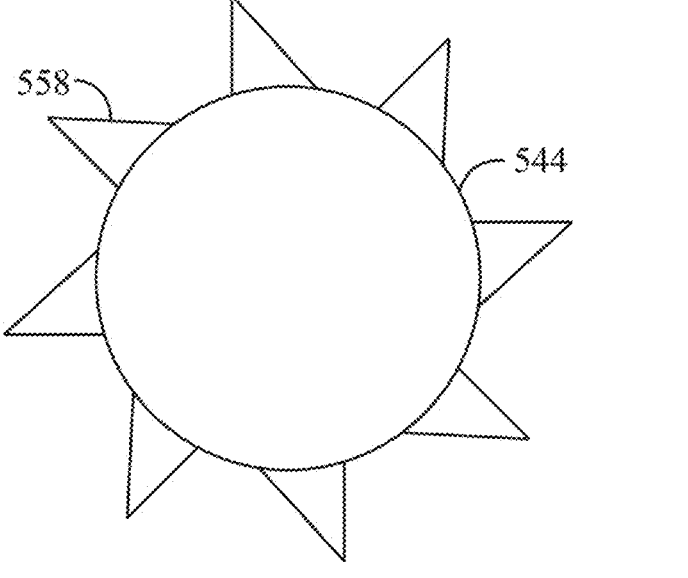
FIG. 5C illustrates a cross-sectional side-view of an example of one-way ratchet locking system.

FIG. 5C shows a cross-sectional view of the first segment 544, in accordance with one or more examples of the present disclosure. In some examples, the first segment 544 of the friction clutch 520 can be a ratchet lock. In at least one example, the inner ridges 554 shown in FIG. 5B can be ridges 558 including ratchet teeth or extensions as illustrated in FIG. 5C. In at least one example, the ridges 558 can shaped to enable the first segment 544 to induce the second segment 546 to rotate in a single direction rather than both directions. In this example, ridges 558 can be configured to enable the first segment 544 to be rotationally coupled to the second segment 546 in one direction but decoupled when rotating the opposite direction.

Any of the features, components, and/or parts shown in FIG. 5C can be included, either alone or in any combination, in any of the other examples of devices, features, components, and parts shown in the other figures. Likewise, any of the features, components, and/or parts, including the arrangements and configurations thereof shown in the other figures can be included, either alone or in any combination, in the example of the devices, features, components, and parts shown in FIG. 5C.

To the extent applicable to the present technology, gathering and use of data available from various sources can be used to improve the delivery to users of invitational content or any other content that may be of interest to them. The present disclosure contemplates that in some instances, this gathered data may include personal information data that uniquely identifies or can be used to contact or locate a specific person. Such personal information data can include demographic data, location-based data, telephone numbers, email addresses, TWITTER® ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to deliver targeted content that is of greater interest to the user. Accordingly, use of such personal information data enables users to calculated control of the delivered content. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services or anytime thereafter. In another example, users can select not to provide mood-associated data for targeted content delivery services. In yet another example, users can select to limit the length of time mood-associated data is maintained or entirely prohibit the development of a baseline mood profile. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publicly available information.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

What is claimed is:

1. A head mountable device, comprising:
   a housing defining an internal volume;
   a first display slidably coupled to a first guide within the internal volume;
   a second display slidably coupled to a second guide within the internal volume; and
   a synchronization system comprising a first synchronizer coupled to a second synchronizer, the first synchronizer configured to move in a first direction and the second synchronizer configured to move in a second direction opposite the first direction; wherein:
   the first display is removably coupled to the first synchronizer and the second display is removably coupled to the second synchronizer;
   the first display is configured to disengage with the first synchronizer during a drop event;
   the second display is configured to disengage with the second synchronizer during the drop event; and the first synchronizer is configured to disengage from the second synchronizer during the drop event.

2. The head mountable device of claim 1, wherein the first display disengages with the first synchronizer and the second display disengages with the second synchronizer when the head mountable device experiences a force of at least about 25 Newtons during the drop event.

3. The head mountable device of claim 1, wherein the first synchronizer disengages with the second synchronizer when the head mountable device experiences a force of at least about 25 Newtons.

4. The head mountable device of claim 1, wherein the synchronization system engages the first display and the second display independently and separately from the first guide and the second guide.

5. The head mountable device of claim 1, wherein:
at least one of the first display or the first synchronizer includes a first detent;
at least one of the second display or the second synchronizer includes a second detent;
the first display is removably attached to the first synchronizer at the first detent; and
the second display is removably attached to the second synchronizer at the second detent.

6. The head mountable device of claim 1, wherein the first synchronizer is removably coupled to the second synchronizer via a friction clutch.

7. The head mountable device of claim 6, wherein:
the friction clutch comprises a first segment removably coupled to a second segment; and
the first segment is configured to be recoupled to the second segment by a user after being decoupled during the drop event.

8. The head mountable device of claim 1, wherein the synchronization system includes an actuator configured to automatically move the first synchronizer and the second synchronizer.

9. The head mountable device of claim 1, wherein:
the first display is configured to be recoupled with the first synchronizer by a user after the first display has been disengaged from the first synchronizer during the drop event; and
the second display is configured to be recoupled with the second synchronizer by the user after the second display has been disengaged from the second synchronizer during the drop event.

10. A wearable electronic device, comprising: a housing defining an internal volume; an optical module and an alignment track disposed within the internal volume, the optical module slidably coupled to the alignment track; and an optical adjustment system separate from the alignment track and disposed within the internal volume; wherein: the optical module is removably coupled to the optical adjustment system via a detent locking mechanism, the detent locking mechanism comprising a locking indent configured to receive a locking insert; and a rotary mechanism configured to move the optical adjustment system, wherein: the optical adjustment system further comprises a securement pin and defines a pin aperture; the securement pin is configured to extend through the pin aperture; the securement pin is attached to the housing; and the optical adjustment system is configured to move a length of the pin aperture before disengaging from the optical module during a drop event.

11. The wearable electronic device of claim 10, wherein:
the optical module is configured to decouple from the optical adjustment system during a drop event; and
the optical module is configured to be recoupled to the optical adjustment system.

12. The wearable electronic device of claim 10, wherein:
the locking insert is disposed on the optical module, the locking insert comprising at least one of:
a spring-loaded detent ball;
a canted coil spring;
a magnet;
a leaf spring; or
a break-away pin; and
the locking indent is disposed on a contact surface of the optical adjustment system, the contact surface configured to contact the optical module.

13. The wearable electronic device of claim 10, wherein:
the locking indent is defined by the optical module; and
the locking insert is defined by the optical adjustment system.

14. The wearable electronic device of claim 10, further comprising a readjustment spring disposed between the optical module and the housing.

15. The wearable electronic device of claim 10, wherein a first force configured to cause a coupling of the optical module to the optical adjustment system is less than a second force configured to cause a decoupling of the optical module from the optical adjustment system.

16. An electronic display assembly, comprising:
a housing defining an inner volume;
a first display disposed within the inner volume;
a second display disposed within the inner volume;
a synchronization system disposed within the inner volume and comprising:
a first synchronizer removably coupled to the first display; and
a second synchronizer removably coupled to the second display, wherein:
the first synchronizer is removably coupled to the second synchronizer via a friction clutch; and
the first synchronizer and the second synchronizer are configured to disengage during a drop event.

17. The electronic display assembly of claim 16, wherein the friction clutch comprises at least one of a conical friction clutch or a plate friction clutch.

18. The electronic display assembly of claim 16, wherein the friction clutch comprises a ridge configured to shear off during the drop event.

19. The electronic display assembly of claim 16, wherein the friction clutch comprises a ratchet lock.

* * * * *